United States Patent
Ebara et al.

(10) Patent No.: US 7,028,495 B2
(45) Date of Patent: Apr. 18, 2006

(54) REFRIGERANT CYCLE APPARATUS

(75) Inventors: Toshiyuki Ebara, Gunma (JP); Mamoru Kubo, Gunma (JP); Kazuhisa Otagaki, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 112 days.

(21) Appl. No.: 10/808,595

(22) Filed: Mar. 25, 2004

(65) Prior Publication Data
US 2005/0126194 A1    Jun. 16, 2005

(30) Foreign Application Priority Data
Mar. 25, 2003    (JP)    ............... 2003-083052

(51) Int. Cl.
*F25B 1/00* (2006.01)
*F25B 49/00* (2006.01)
*F04B 25/00* (2006.01)
*F04B 49/00* (2006.01)

(52) U.S. Cl. .................. 62/228.3; 62/175; 62/510; 417/291; 417/310

(58) Field of Classification Search .............. 62/175, 62/222, 228.3, 228.5, 510; 417/291, 292, 417/310
See application file for complete search history.

(56) References Cited

U.S. PATENT DOCUMENTS 5,803,716 A * 9/1998 Wallis et al. .............. 417/310
6,732,542 B1 * 5/2004 Yamasaki et al. ........... 62/278
6,748,754 B1 * 6/2004 Matsumoto et al. ......... 62/175
2004/0165999 A1 * 8/2004 Tadano et al. .............. 417/312

FOREIGN PATENT DOCUMENTS

JP    2-294587    12/1990

* cited by examiner

*Primary Examiner*—Marc Norman
(74) *Attorney, Agent, or Firm*—McDermott Will & Emery LLP

(57) ABSTRACT

For a purpose of realizing a refrigerant cycle apparatus capable of exactly detecting a pressure reverse phenomenon caused in a compression element of a compressor of a multistage compression type, in the refrigerant cycle apparatus in which the multistage compression type compressor constitutes a refrigerant circuit, including an electromotive element, and first and second compression elements driven by the electromotive element in an airtight container to suck an intermediate-pressure refrigerant gas compressed by the first compression element into the second compression element and to compress and discharge the refrigerant gas, the apparatus comprising: a sensor for detecting a discharge refrigerant pressure of the first compression element; and a control device into which an output of the sensor is input, the control device detects reverse of the discharge refrigerant pressures of the first and second compression elements based on the discharge refrigerant pressure of the first compression element.

13 Claims, 4 Drawing Sheets

REFRIGERANT CYCLE APPARATUS

BACKGROUND OF THE INVENTION

The present invention relates to a refrigerant cycle apparatus in which a multistage compression type compressor constitutes a refrigerant circuit including an electromotive element and first and second compression elements driven by the electromotive element in an airtight container to suck an intermediate-pressure refrigerant gas compressed by the first compression element into the second compression element and to compress and discharge the gas.

For example, a two-stage compression type rotary compressor has heretofore comprised an electromotive element including a stator and rotor (the number of revolutions are controlled by an inverter), a first rotary compression element driven by the electromotive element, and a second rotary compression element attached via a phase difference of 180 degrees, which are stored in an airtight container (see Japanese Patent Application Laid-Open No. 2-294587, for example).

Moreover, a refrigerant gas is sucked on a low-pressure chamber side of a cylinder via a suction port of the first rotary compression element by rotation of the electromotive element, and compressed to have an intermediate pressure by operation of a roller and vane. The gas is discharged, for example, into the airtight container from a high-pressure chamber side of the cylinder via a discharge port, discharge noise silencing chamber, and intermediate discharge tube.

The intermediate-pressure refrigerant gas discharged into the airtight container is sucked on the low-pressure chamber side of the cylinder of the second rotary compression element, and compressed by the operation of the roller and vane to constitute a refrigerant gas at a high temperature/pressure. The gas flows into a gas cooler constituting a refrigerant circuit from the high-pressure chamber side via the discharge port and discharge noise silencing chamber, is air-cooled by an outside air, thereafter pressed by an expansion valve (decompression device), and supplied to an evaporator. Then, the refrigerant evaporates, then absorbs heat from periphery to fulfill a cooling function, and controls air in a chamber of a vehicle, for example, in a car air conditioner.

Additionally, when the inside of the chamber of the vehicle is at a high temperature, or when a rotary compressor is restarted in a short time after stopping the vehicle, a refrigerant pressure on the low-pressure side, sucked into the first rotary compression element, sometimes rises. That is, when the compressor is restarted in a short time after the stopping, an amount of refrigerant existing in the evaporator immediately after the stopping is large. Therefore, even when the rotary compressor starts, the refrigerant pressure on the low-pressure side does not easily drop.

On the other hand, the refrigerant pressure on the high-pressure side is controlled not to be raised at a starting time for protection of the refrigerant cycle apparatus. Since the pressure on the high-pressure side is determined at an outside air temperature, a pressure reverse phenomenon occurs at a low outside air temperature. In the phenomenon, a discharge refrigerant pressure of the first rotary compression element becomes higher than that of the second rotary compression element. When this pressure reverse occurs, the rotary compressor falls in an abnormal run state, the operation of the vane becomes unstable, and this causes a problem that durability and run efficiency drop.

SUMMARY OF THE INVENTION

The present invention has been developed to solve a conventional technical problem, and an object thereof is to realize a refrigerant cycle apparatus capable of precisely detecting a pressure reverse phenomenon caused in a compression element of a multistage compression type compressor.

That is, according to the present invention, there is provided a refrigerant cycle apparatus in which a multistage compression type compressor constitutes a refrigerant circuit, including an electromotive element, and first and second compression elements driven by the electromotive element in an airtight container to suck a refrigerant gas having an intermediate pressure, which has been compressed by the first compression element, into the second compression element and to compress and discharge the refrigerant gas, the refrigerant cycle apparatus comprising: a sensor for detecting a discharge refrigerant pressure of the first compression element; and a control device into which an output of the sensor is input, wherein the control device detects reverse of the discharge refrigerant pressures of the first and second compression elements based on the discharge refrigerant pressure of the first compression element.

Moreover, in the present invention, the above-described control device judges that the discharge refrigerant pressures of the first and second compression elements are reversed in a case where the discharge refrigerant pressure of the first compression element rises to a predetermined value.

Furthermore, according to the present invention, there is provided a refrigerant cycle apparatus in which a multistage compression type compressor constitutes a refrigerant circuit, including an electromotive element, and first and second compression elements driven by the electromotive element in an airtight container to suck a refrigerant gas having an intermediate pressure, which has been compressed by the first compression element, into the second compression element and to compress and discharge the refrigerant gas, the refrigerant cycle apparatus comprising: a temperature sensor for detecting a discharge refrigerant temperature of the first compression element; and a control device into which an output of the temperature sensor is input, wherein the control device detects reverse of the discharge refrigerant pressures of the first and second compression elements based on the discharge refrigerant temperature of the first compression element.

Moreover, in the present invention, the above-described control device judges that the discharge refrigerant pressures of the first and second compression elements are reversed in a case where the discharge refrigerant temperature of the first compression element rises to a predetermined value.

Additionally, according to the present invention, there is provided a refrigerant cycle apparatus in which a multistage compression type compressor constitutes a refrigerant circuit, including an electromotive element, and first and second compression elements driven by the electromotive element in an airtight container to suck a refrigerant gas having an intermediate pressure, which has been compressed by the first compression element, into the second compression element and to compress and discharge the refrigerant gas, the refrigerant cycle apparatus comprising: a first sensor for detecting a discharge refrigerant pressure of the first compression element; a second sensor for detecting a discharge refrigerant pressure of the second compression element; and a control device into which outputs of both the sensors are input, wherein the control device detects reverse of the discharge refrigerant pressures of the first and second compression elements based on the discharge refrigerant pressures of the first and second compression elements.

Moreover, according to the present invention, there is provided a refrigerant cycle apparatus in which a multistage compression type compressor constitutes a refrigerant circuit, including an electromotive element, and first and second compression elements driven by the electromotive element in an airtight container to suck a refrigerant gas having an intermediate pressure, which has been compressed by the first compression element, into the second compression element and to compress and discharge the refrigerant gas, the refrigerant cycle apparatus comprising: a first temperature sensor for detecting a discharge refrigerant temperature of the first compression element; a second temperature sensor for detecting a discharge refrigerant temperature of the second compression element; and a control device into which outputs of both the temperature sensors are input, wherein the control device detects reverse of the discharge refrigerant pressures of the first and second compression elements based on the discharge refrigerant temperatures of the first and second compression elements.

Furthermore, in the present invention, the above-described control device judges that the discharge refrigerant pressures of the first and second compression elements are reversed in a case where the discharge refrigerant temperature of the first compression element is higher than that of the second compression element.

Additionally, in the present invention, the control device in the above-described inventions reduces a valve opening of an expansion valve constituting the refrigerant circuit in a case where it is judged that the discharge refrigerant pressures of the first and second compression elements are reversed.

Moreover, in the present invention, the control device in the above-described inventions lowers the number of revolutions of the electromotive element in a case where it is judged that the discharge refrigerant pressures of the first and second compression elements are reversed.

In the present invention, the sensor for detecting the discharge refrigerant pressure of the first compression element, and the control device into which the output of the sensor is input detect the reverse of the discharge refrigerant pressures of the first and second compression elements based on the discharge refrigerant pressure of the first compression element. Therefore, for example, when the discharge refrigerant pressure of the first compression element rises to the predetermined value, it is judged that the discharge refrigerant pressures of the first and second compression elements are reversed. Accordingly, it is possible to detect a pressure reverse phenomenon in the first and second compression elements.

Moreover, the discharge refrigerant pressure of the first compression element changes in association with the discharge refrigerant temperature. In the present invention, the temperature sensor for detecting the discharge refrigerant temperature of the first compression element, and the control device into which the output of the temperature sensor is input detect the reverse of the discharge refrigerant pressures of the first and second compression elements based on the discharge refrigerant temperature of the first compression element. Therefore, for example, when the discharge refrigerant temperature of the first compression element rises to the predetermined value, it is judged that the discharge refrigerant pressures of the first and second compression elements are reversed. Accordingly, the pressure reverse phenomenon in the first and second compression elements can be detected by use of the existing temperature sensor at a low cost without disposing any special pressure sensor.

Furthermore, in the present invention, the first sensor for detecting the discharge refrigerant pressure of the first compression element, the second sensor for detecting the discharge refrigerant pressure of the second compression element, and the control device into which the outputs of both the sensors are input detect the reverse of the discharge refrigerant pressures of the first and second compression elements based on the discharge refrigerant pressures of the first and second compression elements. Therefore, the pressure reverse phenomenon in the first and second compression elements can be securely detected.

Additionally, the discharge refrigerant pressures of the first and second compression elements similarly change in association with the discharge refrigerant temperature. In the present invention, the control device into which the outputs of the first temperature sensor for detecting the discharge refrigerant temperature of the first compression element and the second temperature sensor for detecting the discharge refrigerant temperature of the second compression element are input detects the reverse of the discharge refrigerant pressures of the first and second compression elements based on the discharge refrigerant temperatures of the first and second compression elements. Therefore, for example, when the discharge refrigerant temperature of the first compression element is higher than that of the second compression element, it is judged that the discharge refrigerant pressures of the first and second compression elements are reversed. Accordingly, the pressure reverse phenomenon in the first and second compression elements can be detected by the use of the existing temperature sensor at the low cost without disposing any special pressure sensor.

Moreover, when it is judged that the above-described pressure reverse phenomenon has been caused, the valve opening of the expansion valve is reduced, accordingly pressure drop on the low-pressure side and pressure rise on the high-pressure side are promoted, and it is possible to quickly eliminate the reverse phenomenon at the low cost. When the number of revolutions of the electromotive element of the compressor is lowered, the rise of the discharge refrigerant pressure of the first compression element is suppressed, and the pressure reverse can be eliminated. Especially, the present invention is remarkably preferable in a case where carbon dioxide having a large pressure difference is used as the refrigerant sealed in the refrigerant circuit.

DETAILED DESCRIPTION OF THE PREFERRED EMBODIMENT

Figure 1:
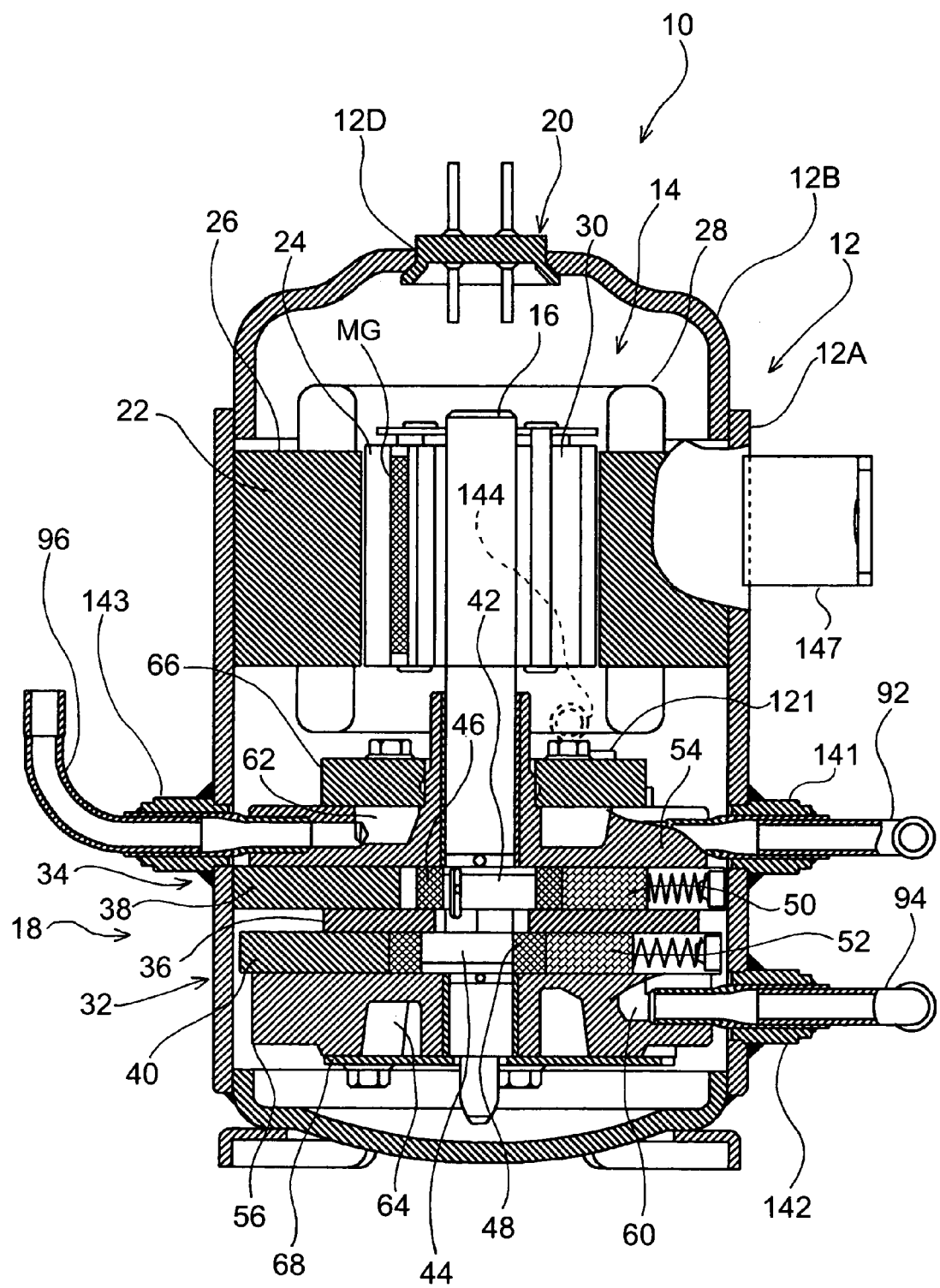
FIG. 1 is a vertical sectional view of an internal intermediate pressure type two-stage compression system rotary compressor constituting a refrigerant cycle apparatus of an embodiment of the present invention.

An embodiment of the present invention will be described hereinafter in detail with reference to the drawings. FIG. 1 is a vertical sectional view of an internal intermediate pressure type multistage (two-stage) compression system rotary compressor 10 including first and second rotary compression elements 32, 34 (either is one example of the compression element), which is an example of the compressor for use in a refrigerant cycle apparatus of the present invention. It is to be noted that the refrigerant cycle apparatus of the embodiment is supercritical on a high-pressure side.

In this figure, reference numeral 10 denotes the internal intermediate pressure type multistage compression system rotary compressor (corresponding to the compressor of the present invention) in which carbon dioxide ($CO_2$) is used as a refrigerant. The rotary compressor 10 comprises: a cylindrical airtight container 12 formed of a steel plate; an electromotive element 14 disposed/stored on an upper side of an internal space of the airtight container 12; and a rotary compression mechanism section 18 disposed under the electromotive element 14, and including the first rotary compression element 32 (first stage) and second rotary compression element 34 (second stage) driven by a rotary shaft 16 of the electromotive element 14.

A bottom part of the airtight container 12 constitutes an oil reservoir. The container comprises a container main body 12A in which the electromotive element 14 and rotary compression mechanism section 18 are stored, and a substantially bowl-shaped end cap (lid member) 12B which closes an upper opening of the container main body 12A. A circular attachment hole 12D is formed in an upper-surface center of the end cap 12B, and a terminal (wiring is omitted) 20 for supplying power to the electromotive element 14 is attached to the attachment hole 12D.

The electromotive element 14 includes a stator 22 attached in an annular shape along an inner peripheral surface of the upper space of the airtight container 12, and a rotor 24 inserted/disposed inside the stator 22 at a slight interval. The rotor 24 is fixed to the rotary shaft 16 extending through the center in a vertical direction.

The stator 22 includes a laminate member 26 in which donut-shaped electromagnetic steel plates are laminated, and a stator coil 28 wound around a teeth portion of the laminate member 26 by a direct winding (concentrated winding) system. The rotor 24 is formed of a laminate member 30 of electromagnetic steel plates in the same manner as in the stator 22, and a permanent magnet MG is inserted and formed in the laminate member 30.

An intermediate partition plate 36 is held between the first rotary compression element 32 and the second rotary compression element 34. That is, the first rotary compression element 32 and second rotary compression element 34 comprise: the intermediate partition plate 36; an upper cylinder 38 and a lower cylinder 40 disposed on/under the intermediate partition plate 36; upper and lower rollers 46, 48 eccentrically rotating by upper and lower eccentric portions 42, 44 disposed on the rotary shaft 16 with a phase difference of 180 degrees in the upper and lower cylinders 38, 40; vanes 50, 52 which abut on the upper and lower rollers 46, 48 to mark off the inside of the upper and lower cylinders 38, 40 on low-pressure and high-pressure chamber sides; and an upper support member 54 and a lower support member 56 which close an upper opening surface of the upper cylinder 38 and a lower opening surface of the lower cylinder 40 and which are support members also serving as bearings of the rotary shaft 16.

On the other hand, the upper and lower support members 54, 56 are provided with: a suction passage 60 (a suction passage on an upper support member 54 side is not shown) communicating with the inside of the upper and lower cylinders 38, 40 in a suction port (not shown); and discharge noise silencing chambers 62, 64 formed by an upper cover 66 and a lower cover 68 which close concave portions obtained by partially depressing the support members.

It is to be noted that the discharge noise silencing chamber 64 communicates with the inside of the airtight container 12 via a communicating path (not shown) extending through the upper and lower cylinders 38, 40 and intermediate partition plate 36. An intermediate discharge tube 121 is vertically disposed on the upper end of the communicating path, and the refrigerant having an intermediate pressure, compressed by the first rotary compression element 32, is discharged into the airtight container 12 from the intermediate discharge tube 121.

Moreover, the upper cover 66 closes the upper-surface opening of the discharge noise silencing chamber 62 communicating with the inside of the upper cylinder 38 of the second rotary compression element 34, and partitions the inside of the airtight container 12 into the discharge noise silencing chamber 62 and electromotive element 14 sides.

Furthermore, in this case, as described above, carbon dioxide ($CO_2$) which is eco-friendly and is a natural refrigerant is used as the refrigerant in consideration of combustibility, toxicity, and the like. For an oil which is a lubricant, the existing oils such as a mineral oil, alkyl benzene oil, ether oil, ester oil, and polyalkyl glycol (PAG) are used.

Sleeves 141, 142, 143, and 144 are welded/fixed to positions corresponding to those of the suction passage 60 (upper side is not shown), discharge noise silencing chamber 62, and upper side of the upper cover 66 (position substantially corresponding to the lower end of the electromotive element 14) of the upper and lower support members 54, 56 on the side surface of the container main body 12A constituting the airtight container 12. The sleeves 141 and 142 are vertically adjacent to each other, and the sleeve 143 is substantially on a diagonal line of the sleeve 141. The sleeve 144 is in a position deviating from that of the sleeve 141 by approximately 90 degrees.

Moreover, one end of a refrigerant introductory tube 92 for introducing the refrigerant gas into the upper cylinder 38 is inserted/connected into the sleeve 141, and one end of the refrigerant introductory tube 92 communicates with a suction passage (not shown) of the upper cylinder 38. The refrigerant introductory tube 92 passes through the upper side of the airtight container 12 and reaches the sleeve 144, and the other end of the tube is inserted/connected into the sleeve 144 and communicates with the inside of the airtight container 12.

Furthermore, one end of a refrigerant introductory tube 94 for introducing the refrigerant gas into the lower cylinder 40 is inserted/connected into the sleeve 142, and one end of the refrigerant introductory tube 94 communicates with the suction passage 60 of the lower cylinder 40. The other end of the refrigerant introductory tube 94 is connected to the lower side of an accumulator 158 (shown in FIG. 2). Additionally, a refrigerant discharge tube 96 is inserted/connected into the sleeve 143, and one end of the refrigerant discharge tube 96 communicates with the discharge noise silencing chamber 62.

The accumulator 158 is a tank for performing gas-liquid separation of the sucked refrigerant, and is attached to a bracket 147 on the airtight container 12 side, welded/fixed to the upper side surface of the container main body 12A of the airtight container 12 via a bracket (not shown) on the accumulator 158 side.

Figure 2:
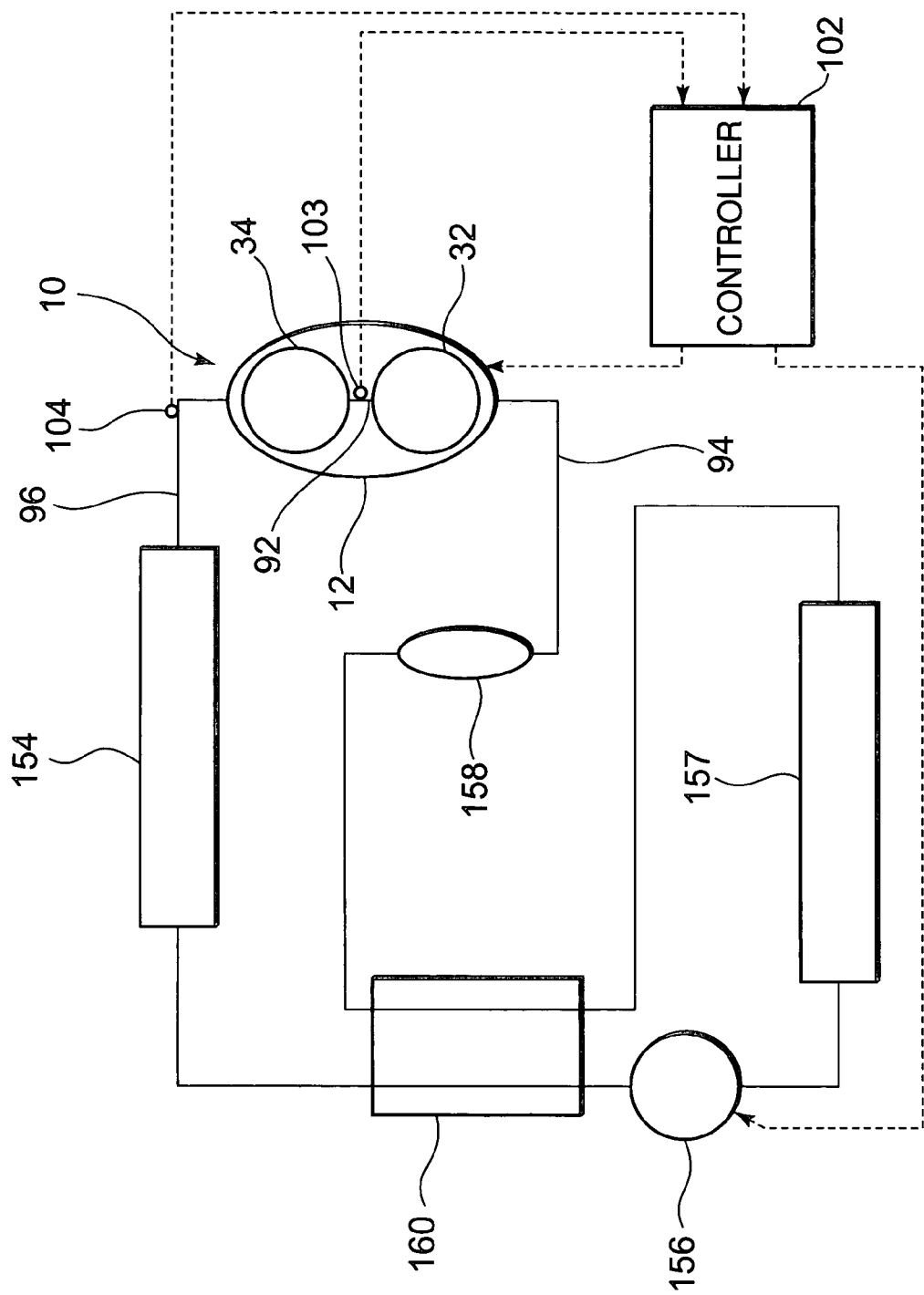
FIG. 2 is a refrigerant circuit diagram showing a car air conditioner of an embodiment of the refrigerant cycle apparatus of the present invention.

Next, FIG. 2 shows a refrigerant circuit in a case where the refrigerant cycle apparatus of the present invention is applied to a car air conditioner. The above-described rotary compressor 10 constitutes a part of the refrigerant circuit of the car air conditioner shown in FIG. 2. That is, the refrigerant discharge tube 96 of the rotary compressor 10 is connected to an inlet of a gas cooler 154. A wiring extended from the gas cooler 154 reaches the inlet of an evaporator 157 via an internal heat exchanger 160 and an electromotive expansion valve 156 (decompression device), and an outlet of the evaporator 157 is connected to the refrigerant introductory tube 94 via the internal heat exchanger 160 and accumulator 158.

Moreover, reference numeral 102 in FIG. 2 denotes a controller including a general-purpose microcomputer which is a control device, and 103 denotes a temperature sensor (first temperature sensor) attached to the refrigerant introductory tube 92. Reference numeral 104 denotes a temperature sensor (second temperature sensor) attached to the refrigerant discharge tube 96. The refrigerant gas having the intermediate pressure, discharged into the airtight container 12, passes through the refrigerant introductory tube 92. The temperature sensor 103 is disposed in order to detect a temperature of the refrigerant gas, that is, the discharge refrigerant temperature of the first rotary compression element 32. Accordingly, the temperature in the airtight container 12 of the rotary compressor 10 is detected, and the stator coil 28 of the electromotive element 14 of the rotary compressor 10 is protected.

On the other hand, the temperature sensor 104 is disposed so as to detect the temperature of the refrigerant gas passing through the refrigerant discharge tube 96, that is, the discharge refrigerant temperature of the second rotary compression element 34, so that a sealing material of the rotary compressor 10 is protected. Outputs of these temperature sensors 103 and 104 are input into the controller 102. Moreover, the controller 102 controls the number of revolutions of (the electromotive element 14 of) the rotary compressor 10 or the valve opening of the electromotive expansion valve 156 based on the outputs of these temperature sensors 103 and 104.

Next, an operation of the above-described constitution will be described. When the controller 102 supplies power to the stator coil 28 of the electromotive element 14 via the terminal 20 and the wiring (not shown), the electromotive element 14 is started to rotate the rotor 24. By this rotation, the upper and lower rollers 46, 48 engaged with the upper and lower eccentric portions 42, 44 integrally disposed on the rotary shaft 16 eccentrically rotate in the upper and lower cylinders 38, 40.

Accordingly, the refrigerant having a low pressure, sucked on a low-pressure chamber side (pressure is about 4 MPaG) of the cylinder 40 from a suction port (not shown) via the refrigerant introductory tube 94 and the suction passage 60 formed in the lower support member 56, is compressed by the operation of the roller 48 and vane 52 to have an intermediate pressure. The refrigerant is discharged into the airtight container 12 from the intermediate discharge tube 121 via a communicating path (not shown) from the high-pressure chamber side of the lower cylinder 40. Accordingly, the inside of the airtight container 12 has an intermediate pressure (about 8 MPaG).

Moreover, the refrigerant gas having the intermediate pressure in the airtight container 12 comes out of the sleeve 144, and is sucked on the low-pressure chamber side of the upper cylinder 38 from the suction port (not shown) via the refrigerant introductory tube 92 and the suction passage (not shown) formed in the upper support member 54. The sucked intermediate-pressure refrigerant gas is subjected to second-stage compression by the operation of the roller 46 and vane 50 to constitute a refrigerant gas at a high pressure/temperature (about 12 MPaG). The gas passes through a discharge port (not shown) from the high-pressure chamber side, and radiates heat by the gas cooler 154 via the discharge noise silencing chamber 62 formed in the upper support member 54, and the refrigerant discharge tube 96. Thereafter, the gas passes through the internal heat exchanger 160. The pressure on the high-pressure side has a supercritical state, and the refrigerant is not condensed in the gas cooler 154 and internal heat exchanger 160. The refrigerant flowing from the internal heat exchanger 160 is pressed (decompressed) by the expansion valve 156 and is liquefied in this process to flow into the evaporator 157.

Then, the refrigerant evaporates, and absorbs heat from the periphery at this time, and accordingly fulfills a cooling function to cool the vehicle chamber. Thereafter, the refrigerant is sucked into the first rotary compression element 32 from the refrigerant introductory tube 94 via the internal heat exchanger 160 and accumulator 158. This cycle is repeated.

When the temperature detected by the temperature sensor 103 rises at a predetermined abnormally high temperature during this run, the controller 102 stops, for example, the electromotive element 14 to execute the protection of the stator coil 28. Even when the temperature detected by the temperature sensor 104 rises at the predetermined abnormally high temperature, the controller 102 stops, for example, the electromotive element 14 to protect the sealing material.

Here, when the temperature in the chamber of the vehicle is high, or when the rotary compressor 10 is restarted in a short time after stopping the vehicle, the refrigerant pressure on the low-pressure side (to the rotary compressor 10 from the expansion valve 156) sucked into the first rotary compression element 32 sometimes rises. This is because the amount of refrigerant existing in the evaporator 157 immediately after the stopping is large in a case where the compressor is restarted in a short time after the stopping. Therefore, even when the rotary compressor 10 is started, the refrigerant pressure on the low-pressure side does not easily drop.

On the other hand, the controller 102 controls and prevents the refrigerant pressure on the high-pressure side (to the expansion valve 156 from the rotary compressor 10) from rising at the starting time of the rotary compressor 10 for the protection of the refrigerant circuit. The pressure on the high-pressure side is determined at the temperature of the outside air to which the gas cooler 154 is exposed. Therefore, at a low outside air temperature, the pressure reverse phenomenon occurs in which the discharge refrigerant pressure of the first rotary compression element 32 is higher than that of the second rotary compression element 34. When this pressure reverse occurs, the rotary compressor 10 falls in the abnormal run state, and the operation of the vane 50 becomes unstable, or vibration is caused. A balance between durability and compression work load of each rotary compression element is remarkably degraded, and run efficiency lowers.

To solve the problem, in the present invention, the controller 102 executes the protection operation at a pressure reverse time as described later. The protection operation at the pressure reverse time in the present invention will be described hereinafter with reference to the operation flowchart of the controller 102 of FIG. 3, and FIG. 4. The controller 102 judges in step S1 of FIG. 3 whether or not a reverse flag is reset ("0"). Here, when it is judged that the flag is reset, the step S1 advances to step S2 to perform judgment based on the outputs of the temperature sensors 103 and 104.

Figure 3:
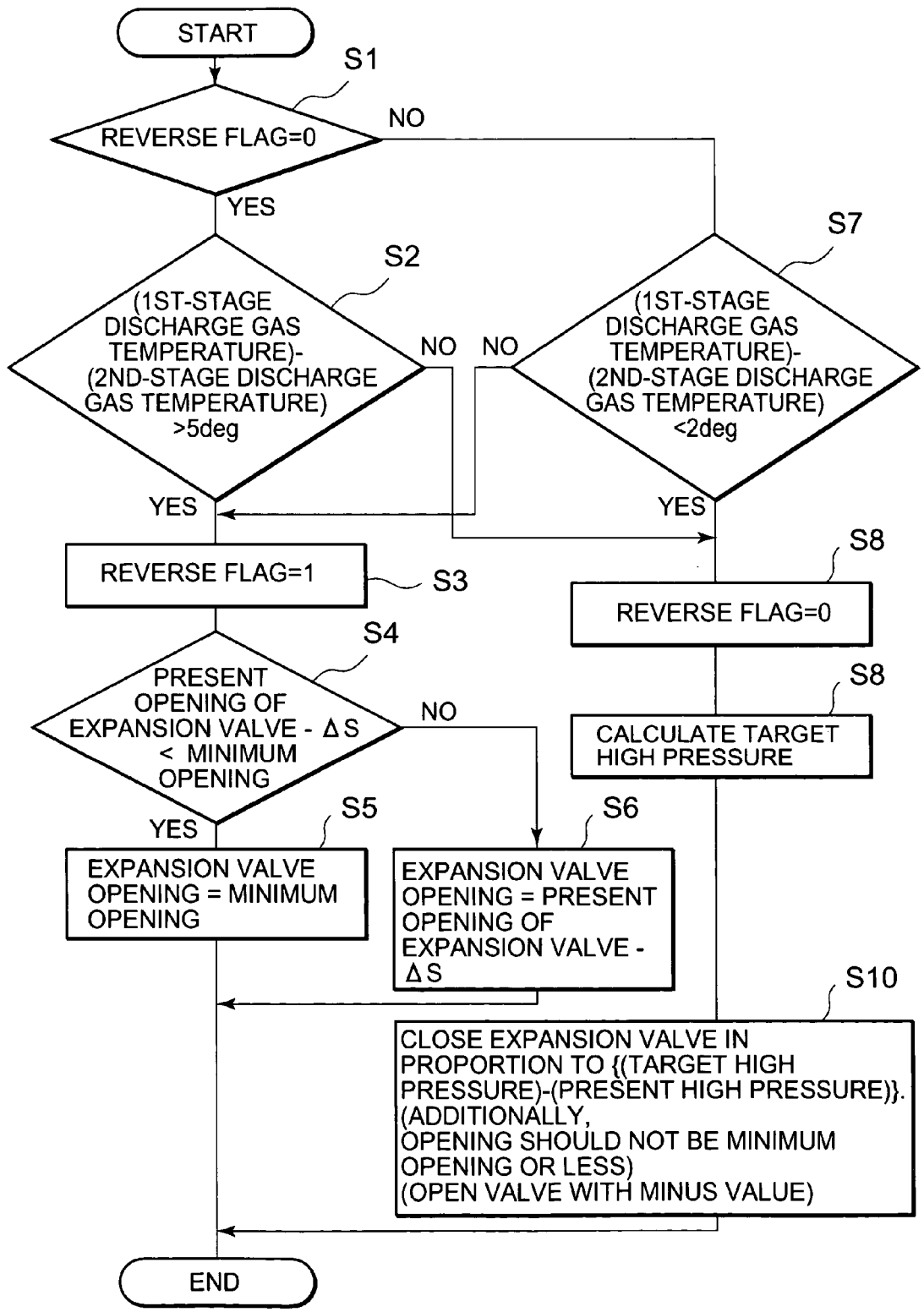
FIG. 3 is a control flowchart of a controller of the refrigerant cycle apparatus of the present invention.
Figure 4:
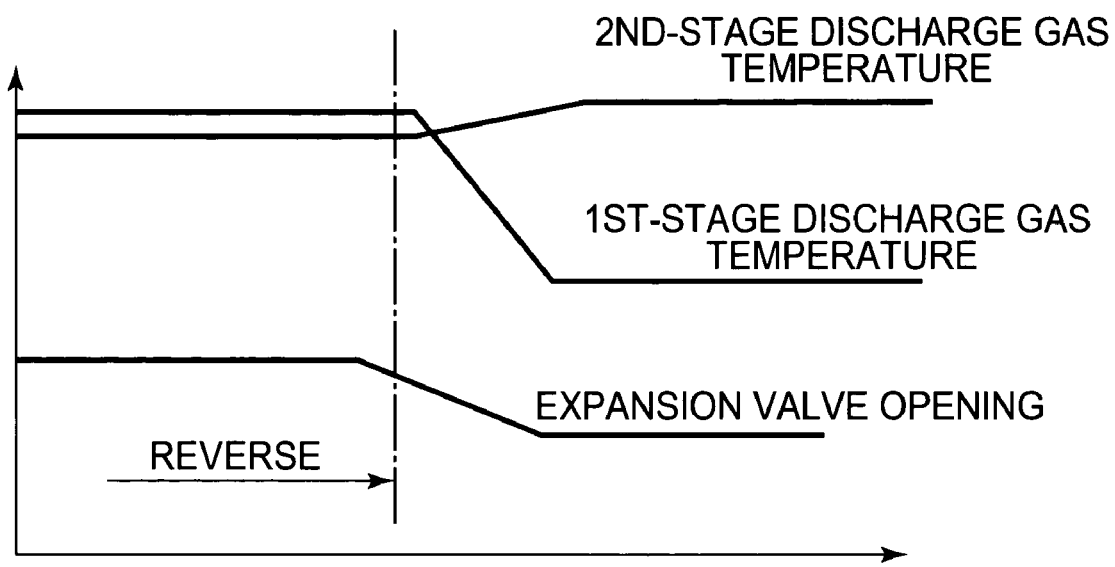
FIG. 4 is an explanatory view showing transitions of discharge refrigerant pressures of the first and second rotary compression elements of the rotary compressor of FIG. 1.

That is, in step S2, a discharge refrigerant temperature T1 of the first rotary compression element 32 detected by the temperature sensor 103 (referred to as a first-stage discharge gas temperature in FIGS. 3 and 4. This also applies below) is compared with a discharge refrigerant temperature T2 of the second rotary compression element 34 (referred to as a second-stage discharge gas temperature in FIGS. 3 and 4. This also applies below). It is judged whether or not the discharge refrigerant temperature T1 of the first rotary compression element 32 is higher than the discharge refrigerant temperature T2 of the second rotary compression element 34 and a difference is larger than 5 deg (ΔT1) (T1−T2>5 deg).

Here, the discharge refrigerant pressure of the first rotary compression element 32 changes in association with (substantially proportionally to or following. This also applies below) the discharge refrigerant temperature of the first rotary compression element 32 detected by the temperature sensor 103. The discharge refrigerant pressure of the second rotary compression element 34 changes in association with the discharge refrigerant temperature of the second rotary compression element 34 detected by the temperature sensor 104. Therefore, when T1−T2>5 deg as described above (shown on the left side of FIG. 4), the discharge refrigerant pressure of the first rotary compression element 32 is apparently higher than that of the second rotary compression element 34, and it can be judged that the pressure reverse occurs.

With T1−T2>5 deg, the controller 102 advances to step S3 from step S2 to set the reverse flag ("1"), and advances to step S4 to judge whether or not the present valve opening of the expansion valve 156 −ΔS is smaller than a minimum valve opening (minimum opening controllable by the expansion valve 156) based on the outputs of the respective temperature sensors 103 and 104. Here, ΔS is set beforehand as a valve opening change value of the expansion valve 156, which is sufficient for solving the pressure reverse.

When the valve opening −ΔS is not smaller than the minimum valve opening in the step S4, the controller advances to step S6 to set the valve opening of the expansion valve 156 to the present valve opening −ΔS and to control the expansion valve 156. That is, the valve opening of the expansion valve 156 is reduced by ΔS. When the valve opening of the expansion valve 156 decreases, the pressure drop on the low-pressure side and the pressure rise on the high-pressure side of the refrigerant circuit are promoted. Therefore, as shown on the right side of FIG. 4, the discharge refrigerant pressure of the second rotary compression element 34 rises, and the discharge refrigerant pressure of the first rotary compression element 32 drops to eliminate the pressure reverse.

It is to be noted that when the present valve opening of the expansion valve 156 −ΔS is smaller than the minimum valve opening, the controller advances to step S5, sets the valve opening of the expansion valve 156 to the minimum opening, and reduces the valve opening to the minimum valve opening.

With T1−T2<2 deg (ΔT2) by the control of the expansion valve 156, the controller 102 judges that the pressure reverse is to be eliminated, advances to steps S7, S8 from the step S1 to reset the reverse flag, and calculates the pressure on the high-pressure side which is a target at the time in step S9. Moreover, in step S10, the valve opening of the expansion valve 156 is adjusted in proportion to target high pressure−present high pressure (the valve opening is reduced when the difference is plus, and enlarged when the difference is minus).

In this manner, the discharge refrigerant pressures of the first and second rotary compression elements 32, 34 are judged by the use of the existing temperature sensors 103 and 104 based on the discharge refrigerant temperatures of the first and second rotary compression elements 32, 34. When the discharge refrigerant temperature of the first rotary compression element 32 is higher than that of the second rotary compression element 34, it is judged that the discharge refrigerant pressures of the first and second rotary compression elements 32, 34 are reversed. Therefore, the pressure reverse phenomenon in the first and second rotary compression elements 32, 34 can be detected without disposing any special pressure sensor.

Moreover, when it is judged that the pressure reverse phenomenon is caused, the valve opening of the expansion valve 156 is reduced. Therefore, the pressure drop on the low-pressure side and the pressure rise on the high-pressure side are promoted, and it is possible to quickly eliminate the reverse phenomenon at the low cost.

It is to be noted that in the present embodiment, the valve opening of the expansion valve 156 is controlled to handle the occurrence of the reverse phenomenon of the discharge refrigerant pressures of the first and second rotary compression elements 32, 34, but the present invention is not limited to this. Alternatively or additionally, the number of revolutions of the electromotive element 14 of the rotary compressor 10 may also be lowered to handle the case. In this case, the discharge refrigerant pressure of the first rotary compression element 32 can be inhibited from rising to eliminate the pressure reverse.

Moreover, the values of ΔT1 and ΔT2 with which the pressure reverse is judged are not limited to those of the present embodiment, ΔT1 may be set to 0 deg or more, and ΔT2 may be appropriately set to a range less than 10 deg. Furthermore, the present embodiment has been described in which the internal intermediate pressure type rotary compressor 10 is applied to the refrigerant circuit of the car air conditioner. However, the present invention is not limited to the rotary compressor, and is effective even in a scrolling or reciprocating type multistage compression system compressor, and, needless to say, the refrigerant circuit is not limited to the car air conditioner.

Furthermore, in the above-described embodiment, the temperature sensors 103 and 104 detect the discharge refrigerant temperatures of both the rotary compression elements 32 and 34. From these values, the occurrence of the pressure reverse phenomenon in the discharge refrigerant pressures of both the rotary compression elements 32 and 34 is judged, but the present invention is not limited to this. The pressure sensors may also be attached to the refrigerant introductory tube 92 and refrigerant discharge tube 96 to directly detect the discharge refrigerant pressures of the first and second rotary compression elements 32, 34, and these reverse phenomena may be judged.

Additionally, it is also possible to judge the pressure reverse phenomenon from the discharge refrigerant pressure or the discharge refrigerant temperature of the first rotary compression element 32. For example, when the pressure sensor is attached only to the refrigerant introductory tube 92, and the discharge refrigerant pressure of the first rotary compression element 32 rises on a predetermined high-pressure side such as 11 MPa, it can be supposed that the pressure reverse occurs in both the rotary compression elements 32, 34.

Similarly, when the temperature sensor 103 is attached only to the refrigerant introductory tube 92, and the discharge refrigerant temperature of the first rotary compression element 32 rises at a predetermined high temperature such as +120° C., the discharge refrigerant pressure of the first rotary compression element 32 rises, and it can be supposed that the pressure reverse occurs in both the rotary compression elements 32, 34.

Moreover, in any case, when the pressure reverse is judged, the above-described protection operation (valve opening reduction of the expansion valve 156 or the drop of the number of revolutions of the electromotive element 14) is executed, and accordingly the pressure reverse can be eliminated.

As described above in detail, according to the present invention, in the refrigerant cycle apparatus in which the multistage compression type compressor constitutes the refrigerant circuit, including the electromotive element, and the first and second compression elements driven by the electromotive element in the airtight container to suck the intermediate-pressure refrigerant gas compressed by the first compression element into the second compression element and to compress and discharge the refrigerant gas, the sensor for detecting the discharge refrigerant pressure of the first compression element and the control device into which the output of the sensor is input detect the reverse of the discharge refrigerant pressures of the first and second compression elements based on the discharge refrigerant pressure of the first compression element. Therefore, for example, when the discharge refrigerant pressure of the first compression element rises to the predetermined value, it is judged that the discharge refrigerant pressures of the first and second compression elements are reversed, and it is accordingly possible to detect the pressure reverse phenomenon in the first and second compression elements.

Moreover, the discharge refrigerant pressure of the first compression element changes in association with the discharge refrigerant temperature. In the present invention, the temperature sensor for detecting the discharge refrigerant temperature of the first compression element, and the control device into which the output of the temperature sensor is input detect the reverse of the discharge refrigerant pressures of the first and second compression elements based on the discharge refrigerant temperature of the first compression element. Therefore, for example, when the discharge refrigerant temperature of the first compression element rises to the predetermined value, it is judged that the discharge refrigerant pressures of the first and second compression elements are reversed. Accordingly, the pressure reverse phenomenon in the first and second compression elements can be detected by the use of the existing temperature sensor at the low cost without disposing any special pressure sensor.

Furthermore, in the present invention, the first sensor for detecting the discharge refrigerant pressure of the first compression element, the second sensor for detecting the discharge refrigerant pressure of the second compression element, and the control device into which the outputs of both the sensors are input detect the reverse of the discharge refrigerant pressures of the first and second compression elements based on the discharge refrigerant pressures of the first and second compression elements. Therefore, the pressure reverse phenomenon in the first and second compression elements can securely be detected.

Moreover, similarly, the discharge refrigerant pressures of the first and second compression elements change in association with the discharge refrigerant temperatures of the elements. In the present invention, the control device into which the outputs of the first temperature sensor for detecting the discharge refrigerant temperature of the first compression element and the second temperature sensor for detecting the discharge refrigerant temperature of the second compression element are input detects the reverse of the discharge refrigerant pressures of the first and second compression elements based on the discharge refrigerant temperatures of the first and second compression elements. Therefore, for example, it is judged that the discharge refrigerant pressures of the first and second compression elements are reversed in a case where the discharge refrigerant temperature of the first compression element is higher than that of the second compression element. Accordingly, the pressure reverse phenomenon in the first and second compression elements can be detected by the use of the existing temperature sensor at the low cost without disposing any special pressure sensor.

Furthermore, in the case where the pressure reverse phenomenon occurs as described above, the valve opening of the expansion valve is reduced, accordingly the pressure drop on the low-pressure side and the pressure rise on the high-pressure side are promoted, and it is possible to quickly eliminate the reverse phenomenon at the low cost. When the number of revolutions of the electromotive element of the compressor is lowered, the rise of the discharge refrigerant pressure of the first compression element is suppressed, and the pressure reverse can be eliminated.

Especially, the present invention is remarkably preferable in a case where carbon dioxide having a large pressure difference is used as the refrigerant sealed in the refrigerant circuit.

What is claimed is:

1. A refrigerant cycle apparatus in which a multistage compression type compressor constitutes a refrigerant circuit, including an electromotive element, and first and second compression elements driven by the electromotive element in an airtight container to suck a refrigerant gas having an intermediate pressure, which has been compressed by the first compression element, into the second compression element and to compress and discharge the refrigerant gas, the apparatus comprising:
   a sensor for detecting a discharge refrigerant pressure of the first compression element; and a control device into which an output of the sensor is input,
   wherein the control device detects reverse of the discharge refrigerant pressures of the first and second compression elements based on the discharge refrigerant pressure of the first compression element.

2. The refrigerant cycle apparatus according to claim 1, wherein the control device judges that the discharge refrigerant pressures of the first and second compression elements are reversed in a case where the discharge refrigerant pressure of the first compression element rises to a predetermined value.

3. A refrigerant cycle apparatus in which a multistage compression type compressor constitutes a refrigerant circuit, including an electromotive element, and first and second compression elements driven by the electromotive element in an airtight container to suck a refrigerant gas having an intermediate pressure, which has been compressed by the first compression element, into the second compression element and to compress and discharge the refrigerant gas, the apparatus comprising:

a temperature sensor for detecting a discharge refrigerant temperature of the first compression element; and a control device into which an output of the temperature sensor is input, wherein the control device detects reverse of the discharge refrigerant pressures of the first and second compression elements based on the discharge refrigerant temperature of the first compression element.

4. The refrigerant cycle apparatus according to claim 3, wherein the control device judges that the discharge refrigerant pressures of the first and second compression elements are reversed in a case where the discharge refrigerant temperature of the first compression element rises to a predetermined value.

5. A refrigerant cycle apparatus in which a multistage compression type compressor constitutes a refrigerant circuit, including an electromotive element, and first and second compression elements driven by the electromotive element in an airtight container to suck a refrigerant gas having an intermediate pressure, which has been compressed by the first compression element, into the second compression element and to compress and discharge the refrigerant gas, the apparatus comprising:

a first sensor for detecting a discharge refrigerant pressure of the first compression element; a second sensor for detecting a discharge refrigerant pressure of the second compression element; and a control device into which outputs of both the sensors are input, wherein the control device detects reverse of the discharge refrigerant pressures of the first and second compression elements based on the discharge refrigerant pressures of the first and second compression elements.

6. A refrigerant cycle apparatus in which a multistage compression type compressor constitutes a refrigerant circuit, including an electromotive element, and first and second compression elements driven by the electromotive element in an airtight container to suck a refrigerant gas having an intermediate pressure, which has been compressed by the firs compression element, into the second compression element and to compress and discharge the refrigerant gas, the apparatus comprising:

a first temperature sensor for detecting a discharge refrigerant temperature of the first compression element; a second temperature sensor for detecting a discharge refrigerant temperature of the second compression element; and a control device into which outputs of both the temperature sensors are input, wherein the control device detects reverse of the discharge refrigerant pressures of the first and second compression elements based on the discharge refrigerant temperatures of the first and second compression elements.

7. The refrigerant cycle apparatus according to claim 6, wherein the control device judges that the discharge refrigerant pressures of the first and second compression elements are reversed in a case where the discharge refrigerant temperature of the first compression element is higher than that of the second compression element.

8. The refrigerant cycle apparatus according to claim 1, 2, 3, 4, 5, 6, or 7, wherein the control device reduces a valve opening of an expansion valve constituting the refrigerant circuit in a case where it is judged that the discharge refrigerant pressures of the first and second compression elements are reversed.

9. The refrigerant cycle apparatus according to claim 1, 2, 3, 4, 5, 6, or 7, wherein the control device lowers the number of revolutions of the electromotive element in a case where it is judged that the discharge refrigerant pressures of the first and second compression elements are reversed.

10. The refrigerant cycle apparatus according to claim 1, 2, 3, 4, 5, 6, or 7, wherein carbon dioxide is used as a refrigerant sealed in the refrigerant circuit.

11. The refrigerant cycle apparatus according to claim 8, wherein the control device lowers the number of revolutions of the electromotive element in a case where it is judged that the discharge refrigerant pressures of the first and second compression elements are reversed.

12. The refrigerant cycle apparatus according to claim 8, wherein carbon dioxide is used as a refrigerant sealed in the refrigerant circuit.

13. The refrigerant cycle apparatus according to claim 9, wherein the carbon dioxide is used as a refrigerant sealed in the refrigerant circuit.

* * * * *